Figure 1:
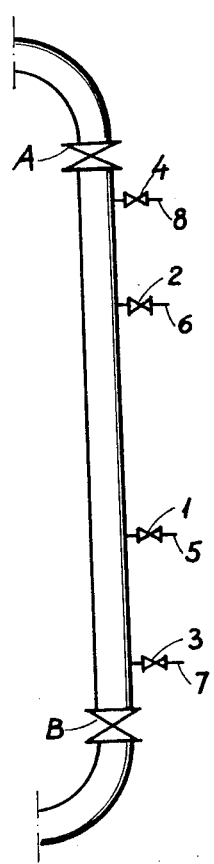

United States Patent

Knudsen

[15] 3,652,254

[45] Mar. 28, 1972

[54] METHOD AND PLANT FOR EFFECTING MASS TRANSFER PROCESSES

[72] Inventor: Knud C. B. Knudsen, Holte, Denmark

[73] Assignee: Aktieselskabet Dansk Svovlsyre-og Superphosphat-Fabrik, Copenhagen, Denmark

[22] Filed: May 4, 1970

[21] Appl. No.: 34,230

[30] Foreign Application Priority Data

May 9, 1969 Great Britain......................23,784/69

[52] U.S. Cl..........................................71/34, 23/107, 71/37, 210/34, 210/38
[51] Int. Cl..................C05b 17/00, C01b 25/28, C02b 1/42
[58] Field of Search.................................71/37–41, 60, 34; 23/312 P, 105 C, 107; 210/38, 34

[56] References Cited

UNITED STATES PATENTS

| 2,413,844 | 1/1947 | Rawlings | 210/26 X |
|---|---|---|---|
| 2,891,007 | 6/1969 | Caskey | 210/35 X |
| 2,330,865 | 10/1963 | Butzler | 210/34 |
| 3,522,002 | 7/1970 | Lefevre | 210/38 X |
| 2,797,190 | 6/1957 | Scott et al. | 210/34 X |
| 3,268,604 | 8/1966 | Boyd | 210/34 X |
| 2,815,322 | 12/1957 | Higgins | 210/189 X |
| 3,492,092 | 1/1970 | Higgins | 210/38 X |
| 2,793,953 | 5/1957 | Loo | 99/54 |
| 3,382,035 | 5/1968 | Slater | 71/39 X |
| 2,413,784 | 1/1947 | Rawlings et al. | 210/38 X |
| 2,891,007 | 6/1959 | Caskey et al. | 210/35 |

FOREIGN PATENTS OR APPLICATIONS

| 116,956 | 5/1943 | Australia | 210/34 |
|---|---|---|---|
| 538,818 | 8/1941 | Great Britain | 210/34 |
| 1,052,410 | 12/1966 | Great Britain | 23/165 C |
| 1,533,513 | 7/1968 | France | 23/165 C |

*Primary Examiner*—Reuben Friedman
*Assistant Examiner*—Richard Barnes
*Attorney*—Lawrence Rosen and E. Janet Berry

[57] ABSTRACT

The invention relates to a method and a plant for effecting a mass transfer between a liquid and a granular solid, in which the solid is in a fixed bed arrangement in a loop circuit, the liquid being sent to part of said fixed bed through inlets and outlets which are moved forward stepwise upon exhaustion of the solid, the process liquid being replaced, in the exhausted part, by a stripping liquid, the inlet and the outlet of which are also moved stepwise forward as the transfer zone is moved.

1 Claims, 4 Drawing Figures

METHOD AND PLANT FOR EFFECTING MASS TRANSFER PROCESSES

The present invention relates to a method and a plant for effecting mass transfer processes between a liquid and a granular material.

The term "mass transfer process" generally comprises any process by which a liquid is contacted with a granular solid in order to transfer a component dissolved or suspended in the liquid to the solid, for example by adsorption or by ion exchange, in order to purify the liquid, to recover the said component, or to exchange it for another component, as in chromatographic or ion exchange processes, and although the present method is particularly described hereinafter in relation to ion exchanging, it should be understood that the same technique can equally well be applied to other adsorption processes.

In the conventional ion exchange technique using fixed bed exchangers, the field of application is limited to rather dilute solutions. If applied to highly concentrated solutions, the volume of liquid to be treated may be much smaller than the necessary volume of ion exchange resin, and stripping of the ion exchanged liquid, therefore, involves an excessive dilution, making the process economically inattractive.

In an attempt to overcome this disadvantage, a countercurrent method has been proposed, in which a bed of ion exchange resin is moved in one direction in a device in the form of a loop circuit, the liquid to be subjected to ion exchange, and the stripping and regenerating liquids being moved countercurrently to the movement of the resin.

The bed of particulate ion exchange material is confined within the loop circuit, which is provided with hydraulic means for moving the exchange material for some distance at a time. Along the loop circuit, inlet or feed pipes and outlet pipes are suitably spaced and provided with valves.

The cycle of operation in this device is substantially as follows in a cation exchange process. The liquid to be ion exchanged is fed through an inlet pipe into a zone I with exchange material loaded with the desired cation, the cation exchanged liquid leaving the circuit through an outlet pipe suitably spaced from the inlet pipe. When the exchange material shows signs of being exhausted, valves on the inlet and outlet pipes are closed, and the bed of exchange material is moved to a zone II to bring a new portion of loaded exchange material into zone I. After this movement, a stripping liquid is countercurrently fed into zone II to displace the liquid in the spaces between the particles of exchange material and return it into zone I.

In a third zone III, the exhausted exchange material is recharged with the desired cation by passing a solution containing this cation through zone III.

The idea is thus to return the interfaces between the various liquids to the original positions after movement of the exchange material.

The method has some advantages as compared to the conventional fixed bed methods in that it is possible to get more concentrated ion exchange products, and in that the exchange material or resin volume is utilized more efficiently. However, it also has some disadvantages. In a large diameter device it is difficult to ensure a uniform and regular movement of the resin in all parts of the unit, and faults in this respect may obviously disturb the process conditions seriously. Also, during the resin movement, the liquids move faster than the resin— usually two to three times—in the same direction as the resin, which increases the difficulties in returning the interfaces to the original positions. It will be seen that the timeconsuming and the inevitable diluting effects of these steps may be very pronounced, if the volume of concentrated solution to be treated is only a fraction of the corresponding resin volume, i.e., if the liquid flow is small as compared to the resin flow, as when the process is applied to fairly concentrated solutions. A further disadvantage to be mentioned is, that from a resin attrition point of view it is not desirable to move the resin mass.

It is the object of the present invention to provide a method and a plant, which make it possible to obtain the advantages of a continuous countercurrent liquid-solid mass transfer without incurring the above mentioned disadvantages.

With this object in view, the present method comprises passing the liquid, hereinafter called the process liquid, through part of a fixed bed, or of a series of fixed beds, of the granular solid in a loop circuit with a stepwise forward movement of the inlet and outlet places for the process liquid to move the transfer zone when the transfer capacity in said part of the granular material has been exhausted, replacing the process liquid in the exhausted zone by a stripping liquid, the inlet and outlet places of which are also moved stepwise forward, when the transfer zone is moved.

In this manner, only liquids are moved within the loop circuit. When the transfer capacity of the granular material in contact with the process liquid has been exhausted, which is checked by a conductivity metering or in other suitable manner, the inlet and outlet for the process liquid are each moved one step forward, and at the same time a stripping liquid is admitted to the exhausted zone of granular material to displace process liquid remaining therein, for example to the new contact zone.

Behind the stripping zone, a regeneration of the exhausted granular material may be effected, or a replacement with fresh material, to keep the circuit working continuously.

In a preferred embodiment of the present method, the process liquid is an electrolyte, and the granular material is an ion exchanger, the advantage being that undesirable ions in the process liquid can be removed or exchanged for desirable ones without any dilution of the process liquid.

This is particularly advantageous in an embodiment of the present method, in which the process liquid is a slurry of digested rock phosphate, and the granular material is a cation exchanger loaded with potassium ions. The process liquid in this case contains a large proportion of calcium ions which are undesired from a fertilizing point of view. Replacing all or part of these calcium ions with potassium ions results in a multinutrient fertilizer composition of desirable properties.

A plant for effecting a mass transfer process according to the present invention comprises a fixed bed arrangement of a granular material in a loop circuit with main pipes for admitting and withdrawing process liquids, stripping liquids, and regeneration liquids, respectively, through suitably spaced inlet and outlet pipes to the fixed bed granular material along the circuit, each of said inlet and outlet pipes being provided with a valve, and means being provided for automatically operating the valves in a predetermined cycle.

Figure 2:
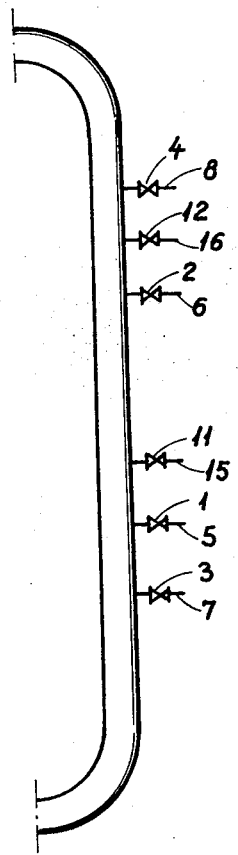
Figure 3:
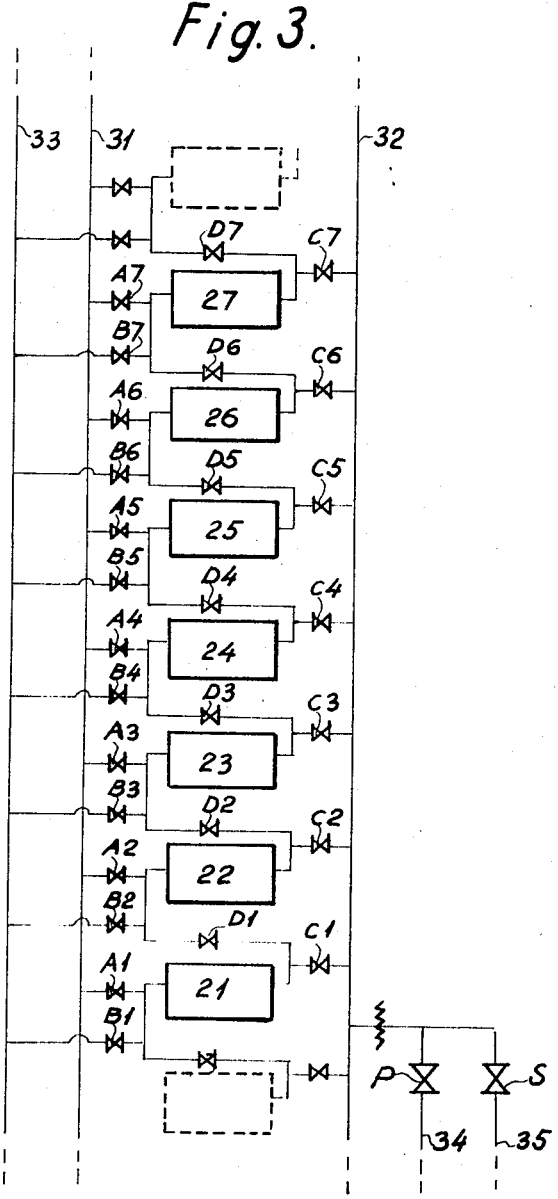
Figure 4:
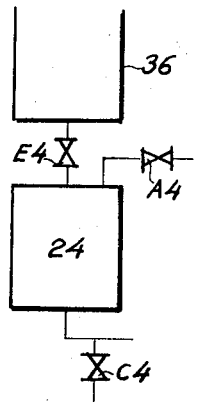

For a better understanding of the invention, reference is made to the accompanying drawings, in which FIG. 1 is an elevation of part of an embodiment of a loop circuit designed for movement of the bed of exchange material as formerly known, FIG. 2 for comparison purposes shows the device of FIG. 1 as adapted for use according to the present invention, FIG. 3 is a schematical view of an embodiment of the apparatus of the invention as presently preferred for practical use, and FIG. 4 is a schematical view of another embodiment of the resin beds of FIG. 3.

FIG. 1 shows the loading section of a loop circuit adapted for movement of an exchange resin bed. Resin particles charged with the ions for the exchange are confined between valves A and B. Process liquid is admitted through an inlet 5 with a valve 1, and leaves through an outlet 6 with a valve 2.

A stripping liquid, e.g., water, can be admitted through an inlet 7 with a valve 3, and withdrawn through an outlet 8 with a valve 4.

During the flow of the liquid to be exchanged, called the process liquid, valves A and B are closed, and 1 and 2 are open for feeding and withdrawing of the process liquid. When sampling indicates exhaustion of the exchange resin, valves 1 and 2 are closed, and valves A and B are opened to allow a hydraulic pressure to slide the resin bed countercurrently to the direction of the previous process liquid flow to bring freshly charged exchange resin into the loading section, and to bring the spent resin to a section for rinsing or stripping and subsequent recharging. After that it is in principle possible to reverse the valves and start the liquid flow again. However, during the resin movement period, the liquids inside the ion exchanger move in the same direction as the resin. Therefore, it is necessary to return the interfaces between the various liquids to their original position before starting the normal liquid flow again. For the loading section, this can be done by admitting rinse water through the valve 3 and withdrawing slip water through the valve 4 of FIG. 1.

Turning now to FIG. 2, illustrating the principles of the present invention, the valves 1 and 2 are again open during the production step. When the bed shows exhaustion, valves 1 and 2 are closed and valves 3 and 4 are opened. This results in the process liquid remaining in the partly exhausted section of the resin bed being moved from a position between the valves 1 and 2 to a position between valves 11 and 12 in an inlet 15 and an outlet 16, respectively. After that the production flow is started again through the valves 11 and 12. It will be seen that the movement of the liquid interfaces by means of the flow through the valves 3 and 4 in FIG. 2 substitutes two steps in FIG. 1—resin movement plus liquid interface movement over a longer distance—and at the same time excludes all the above mentioned difficulties and disadvantages. The method can be realized by use of an appropriate number of inlets and outlets with valves, and it is no technical problem nowadays to operate these valves automatically according to a chosen program.

The practical working out of this principle may, for example, be as illustrated in FIG. 3, showing the loading section of a resin exchange material arranged in a loop circuit. The resin is kept in separate beds, some of which are numbered 21 to 27. A main pipe 31 for the process liquid has connections with valves A1 to A7 to the beds, and a main pipe 33 for rinse liquid, e.g., water, is likewise connected, the connections having valves B1 to B7. The beds 21 to 27 are further interconnected with valves D1 to D7 in the connections. A main pipe 32 serves for collection of spent process liquid and rinse liquid through connections to the individual beds having valves C1 to C7, and lets of these liquids through pipes 34 and 35, respectively, with valves P and S. The undulated line represents a conductivity meter or other device for measuring concentrations.

As an example, the valves A2, D2, D3, D4, C5, and P are open during a production step, all other shown valves being closed. When this step is terminated, the valves B1, D1, D2, D3, D4, D5, D6, C7, and P are opened, and all other shown valves are closed. The conductivity meter determines, when valve P is to be closed and valve S to be opened. When the liquids are in the right positions, the next production step may start, which is accomplished by the opening of the valves A3, D3, D4, D5, C6, and P. The rest of the loop is simultaneously and correspondingly worked on regeneration and, if necessary, backwash.

The flexibility of the system is obvious. Different numbers of resin beds, i.e., different bed volumes, can be used for the different parts of the procedure depending on the acceptable losses and the required concentrations in a given ion exchange process. Alterations can be made simply by changing the program determining the operation of the valves. One or more backwash operations can be established at the most convenient place in the procedure.

In this system it is generally advisable to keep the empty space above the resin bed in the vessel at a minimum, which impedes the free expansion of the bed during backwash. This problem can be overcome in a known way, for instance by external backwash or by means of an inflatable bag inside the vessel. However, it is preferred to use an apparatus as illustrated in FIG. 4. On top of the container housing the resin bed is placed a valve, which is open during the backwash, and which allows the resin to expand into an empty vessel placed above the bed. This means that only part of the resin leaves the bed during the backwash, whereas by external backwash the whole of the resin must be removed.

The method of the invention is further illustrated by the following example:

EXAMPLE

In a pilot plant comprising 12 resin beds, each containing 13 liters of cation exchange resin of the sulphonated styrene-divinylbenzene copolymer type, two beds were used for the exchange process, two for stripping of the process liquid, two for rinse water, one for backwash, four for regeneration, and one for regeneration rinsing. The object was to introduce potassium ions into a slurry containing calcium and other ions. The regeneration was made with potassium chloride. In the regeneration section, 560 grams of potassium was introduced into each bed of resin, corresponding to 1.1 equivalents of potassium per liter of resin. By analyzing, the product withdrawn from the loading section was found to contain 7.65 percent potassium, and the density of the solution was 1.31 g./cm.$^3$, i.e., the product solution contained 2.6 equivalents of potassium per liter, whereas the resin only contained 1.1 equivalents of potassium per liter.

What is claimed is:

1. A method for effecting a mass transfer process between a process liquid in the form of a slurry of digested phosphate rock and an ion exchange resin loaded with potassium ions which comprises passing the said process liquid through part of a fixed bed arrangement of the ion exchange resin in a loop circuit so as to replace the calcium ions in the process liquid with the potassium ions of the ion exchange resin, a stepwise forward movement of inlet and outlet places for the process liquid being treated in order to move the transfer zone when the transfer capacity in said part of the ion exchange resin has been exhausted, moving the process liquid remaining in the exhausted zone forward to a fresh part of the ion exchange resin by passing a stripping liquid through the exhausted bed and into the next transfer zone, the inlet and outlet of the stripping liquid being also moved stepwise forward when the transfer zone is moved, and regenerating the exhausted zone with a potassium chloride solution, said inlet and outlet places of the potassium chloride solution moved stepwise forward when the transfer zone is moved.

* * * * *